May 12, 1931. S. P. THOMAS 1,804,897
HIGH PRESSURE RELIEF VALVE
Filed May 23, 1928
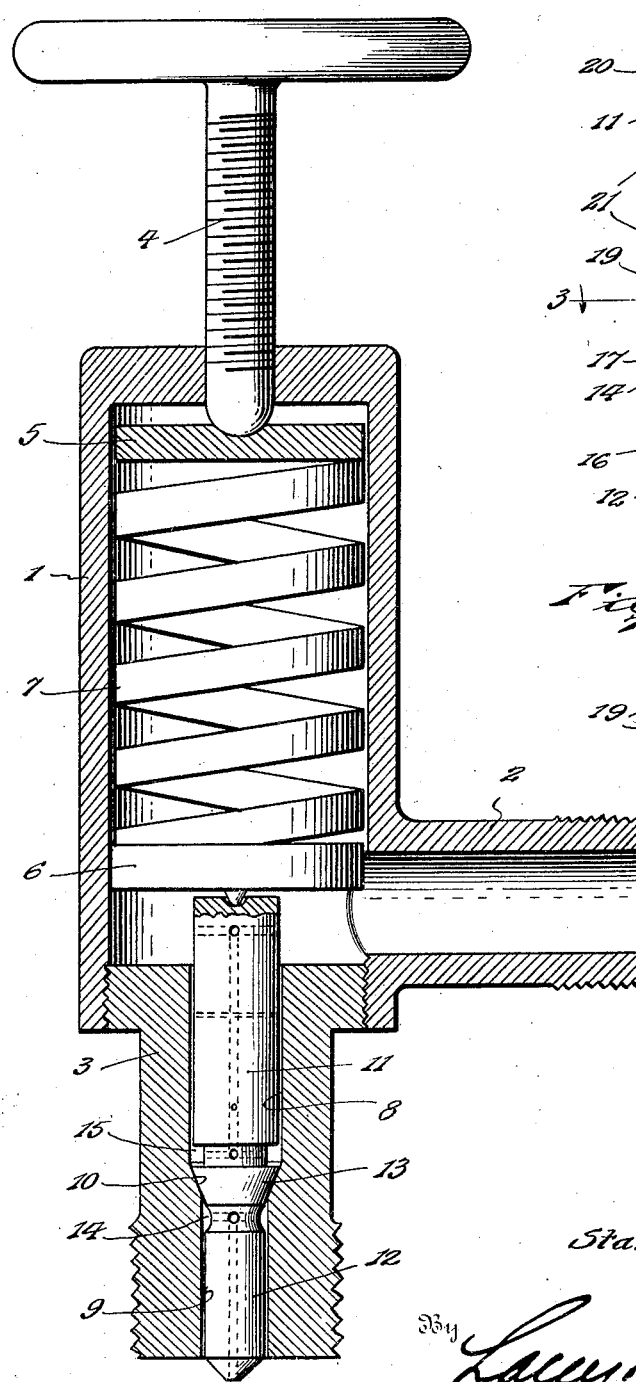
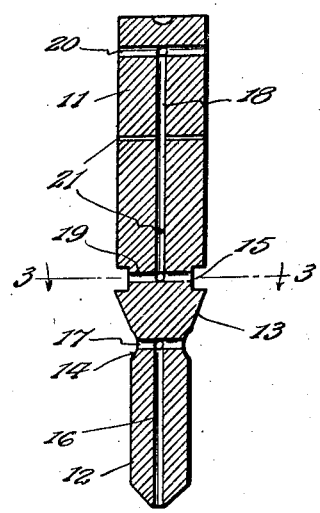
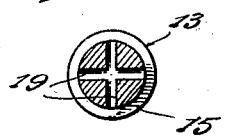
Inventor
Stanley P. Thomas.
By Lacey & Lacey, Attorneys Patented May 12, 1931

1,804,897

UNITED STATES PATENT OFFICE

STANLEY P. THOMAS, OF MERCED, CALIFORNIA

HIGH PRESSURE RELIEF VALVE

Application filed May 23, 1928. Serial No. 280,030.

Valves for relieving high pressure as ordinarily constructed chatter which is both annoying and detrimental to the piping and joints because of the vibration.

This invention provides a valve which is balanced and centered by the fluid pressure and free from chatter and noise, hence not susceptible to vibration.

The invention contemplates a pressure regulating valve embodying few parts which are readily accessible for any desired purpose.

While the drawing illustrates a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which,—

Figure 1 is a sectional view of a high pressure relief valve embodying the invention.

Figure 2 is a sectional view of the valve plug.

Figure 3 is a detailed sectional view of the valve plug on the line 3—3 of Figure 2.

Corresponding and like parts are referred to in the following description and designated in the several views of the drawing by like reference characters.

The body or casing of the valve is preferably of sectional formation and comprises the upper section 1 having a lateral outlet 2 and the lower section 3 which is threaded to the section 1. A screw 4 is threaded into an opening formed in the upper closed end of the section 1. Plates or discs 5 and 6 are disposed within the section 1 and receive a heavy coil spring 7 between them, the effective tension of which is regulated by means of the screw 4. The lower section 3 of the valve body or casing is externally threaded at its lower end for convenience of attachment to the part to which the valve may be fitted. An axial bore or opening is formed in the part 3 and includes an upper enlarged portion 8 and a lower reduced portion 9. A conical portion 10 is formed between the end portions 8 and 9 and constitutes a valve seat.

A valve plug is fitted within the axial opening or bore of the body section 3 and comprises an upper enlarged portion 11, a lower reduced portion 12 and an intermediate conical portion 13 which conforms to the valve seat 10 and constitutes the valve proper.

An annular groove 14 is formed in the valve plug adjacent the lower end of the valve 13. An annular groove 15 is formed in the valve plug adjacent the upper end of the valve 13. The annular groove 14 is half round, whereas the annular groove 15 is of uniform depth. An axial opening 16 formed in the lower portion 12 of the valve plug terminates in the plane of the annular groove 14 and communicates with radial openings 17. An axial opening 18 formed in the upper portion 11 of the valve plug is in communication at its lower end with radial openings 19 in the plane of the annular groove 15, and connects at its upper end with radial openings 20. Minute openings 21 are formed transversely in the upper portion 11 of the valve body and intersect the axial opening 18, and are angularly disposed and located at different points in the length of the valve plug.

The lower end of the valve plug tapers and normally projects below the part 3 of the valve body. The upper portion of the valve plug projects some distance above the part 3 and is in contact with the lower plate or disk 6 so as to receive the pressure exerted by means of the spring 7. The lower part 12 of the valve plug is slightly less in diameter than the lower portion 9 of the axial opening formed in the part 3, thereby forming an exceedingly small space about the part 12, whereby the pressure fluid therein will maintain the part 12 centered to prevent chattering thereof.

The upper portion 11 of the valve plug is of a slightly less diameter than the opening 8, whereby to provide an extremely small space to also receive pressure fluid to prevent noise and chatter of the valve plug and hold it in centered position. The space surrounding the lower part 12 of the valve plug is in direct communication with the part to which the valve may be coupled and is at all times under pressure. The space surrounding the part 11 of the valve plug receives pressure at such times only when the valve 13 is unseated. At these times the pressure passes through the openings 16 and 17 into the annular groove 14, thence by the valve 13 into the annular groove 15, thence into the space surrounding the upper part 11 of the valve body, as will be readily understood. The major portion of the pressure relieved when the valve 13 is unseated passes from the annular groove 15 into the openings 19, thence through the openings 18 and 20 into the upper portion 1 of the valve body and through the outlet 2. The transverse openings 21 serve to distribute the pressure in the space surrounding the part 11, thereby maintaining the valve in centered position and preventing chatter and the ill effects incident thereto.

Having thus described the invention, I claim:

1. A pressure valve including a valve body having an inlet and an outlet, said inlet embodying end portions of different diameters and an intermediate tapering portion forming a valve seat, a valve plug within the inlet and comprising an intermediate conical valve and end portions of different diameters loosely fitting the respective end portions of the said inlet to leave a small space for a pressure fluid, said valve plug having annular grooves adjacent the conical valve portion, and having radial openings and axial openings in the respective end portions, the radial openings connecting the respective annular grooves with one end of an axial opening, and the other ends of the axial openings connecting with the inlet and the outlet respectively, and means normally holding the valve seated.

2. A pressure valve comprising a sectional valve body, the upper section having an outlet and the lower section an axial opening forming an inlet having an intermediate valve seat and end portions of different diameters, a valve plug within the inlet and having end portions annually spaced from the respective end portions of the inlet and formed with axial and radial openings and annular grooves, and having the intermediate portion tapering to provide a conical valve, the radial openings connecting the respective annular grooves with one end of an axial opening, and the other ends of the axial openings connecting with the inlet and the outlet respectively, a spring within the upper portion of the valve body and means for regulating the tension of the spring.

3. A pressure valve including a body having an inlet, an outlet, and an intermediate valve seat, and a normally seated valve plug in the inlet and comprising an intermediate valve and end guide portions having an exceedingly small enveloping space to contain a pressure fluid to center and prevent chatter of the valve and having annular grooves in the guide portions adjacent the valve in communication with the respective enveloping fluid pressure receiving spaces, the guide portion adjacent the inlet having an axial opening and radial openings connecting the axial opening with the annular groove, and the guide portion adjacent the outlet having an axial opening, radial openings connecting the axial opening with the annular groove, and other radial openings connecting the axial opening with the enveloping fluid pressure containing space at different points in its length.

In testimony whereof I affix my signature.

STANLEY P. THOMAS. [L. S.]